United States Patent [19]
Schaffer

[11] 3,881,518
[45] May 6, 1975

[54] MEMORY CIRCUIT FOR BINARY COUNTER

[75] Inventor: David J. Schaffer, Tempe, Ariz.

[73] Assignee: The Garrett Corporation, Los Angeles, Calif.

[22] Filed: Apr. 1, 1974

[21] Appl. No.: 456,486

[52] U.S. Cl. .......... 137/821; 137/829; 235/201 ME
[51] Int. Cl. .......... F15c 3/00; F15c 1/08
[58] Field of Search .......... 137/821, 829; 235/201 R, 235/201 ME, 201 PF

[56] References Cited

UNITED STATES PATENTS

| | | | |
|---|---|---|---|
| 3,219,271 | 11/1965 | Bauer | 137/817 |
| 3,362,633 | 1/1968 | Freeman | 235/201 ME |
| 3,399,829 | 9/1968 | Richards et al. | 137/821 |
| 3,433,408 | 3/1969 | Bellman et al. | 137/821 X |
| 3,504,693 | 4/1970 | Hartman | 137/829 X |
| 3,519,013 | 7/1970 | Amos | 137/112 |
| 3,589,601 | 6/1971 | Schaffer | 137/821 X |

*Primary Examiner*—William R. Cline
*Attorney, Agent, or Firm*—Herschel C. Omohundro; Jack D. Puffer; Albert J. Miller

[57] ABSTRACT

The subject circuit has a source of fluid pressure, a bistable fluidic amplifier, an indicator moved by fluid impulses from the amplifier when count signals are applied thereto, a plurality of "not" elements for supplying fluid impulses to the control ports of the bistable amplifier, a "one shot" element for directing actuating signals to the "not" elements when the fluid pressure source is re-energized after being shut off, and means, dependent upon the indicating position of the indicator, to block the actuating signal to a certain "not" element whereby a predetermined control port of the amplifier will be precluded from receiving an impulse and the indicator will remain in the same indicating position it occupied when the power source was shut off until the next succeeding count signal is applied to the bistable amplifier.

8 Claims, 4 Drawing Figures

MEMORY CIRCUIT FOR BINARY COUNTER

BACKGROUND OF THE INVENTION

This invention relates generally to the fluidic art and more particularly to fluidic binary counting apparatus of the type suggested by the patents U.S. Pat. No. 3,219,271 to Bauer and U.S. Pat. No. 3,433,408 to Bellman et al. Still more particularly, this invention relates fluidic counters with memory characteristics such as exemplified by the patents U.S. Pat. No. 3,504,693 to Hartman and U.S. Pat. No. 3,519,013 to Amos. In many of the devices previously provided, objections were present due to complicated construction and/or faulty operation resulting from loss or interruption of power during a counting operation. In some prior devices the restoration of power following an interruption would result in a false count, thus rendering the apparatus inaccurate and undesirable.

SUMMARY OF THE INVENTION

One object of the present invention is to provide a binary counter stage with memory characteristics which will avoid the above-mentioned and other objections.

Another object of the invention is to provide a binary counter stage having an indicator and fluidic circuit means which will retain the indicator in the position of its last count when the power supply is interrupted and then restored, the indicator position being held until the next succeeding counting signal is applied.

Still another object of the invention is to provide a fluidic binary counter stage having a source of fluid pressure, a bistable amplifier to provide actuating impulses to an indicator when count signals are supplied to the amplifier, the indicator having means for temporarily retaining it in indicating positions, and a fluidic circuit dependent in part on the indicator position for retaining the indicator in such position upon an interruption and subsequent restoration of power to the source.

Another object of the invention is to provide the counter stage mentioned in the preceding paragraph with a plurality of fluidic "not" elements arranged to direct signals to control ports of the bistable amplifier to cause it to send actuating pulses to the indicator, the latter having means dependent upon the indicating position thereof to select which of a plurality of actuating pulses will be sent by the amplifier.

Still another object of the invention is to provide the counter stage mentioned in the two preceding paragraphs with a fluidic element operative when the source of fluid pressure for the counter stage is energized to direct a single fluid pressure impulse to the control ports of the "not" elements so that at least one thereof will be caused to direct a signal to the bistable amplifier control port connected therewith.

An object, also, is to provide the fluidic element mentioned in the preceding paragraph with a construction which will automatically direct the single fluid pressure impluse to the "not" elements when the fluid pressure source is initially energized and will then remain inactive until the source is de-energized and re-energized again.

Other objects and advantages will be set forth or suggested by the following description of one form of the invention which has been disclosed in the accompanying drawing.

IN THE DRAWING

Figure 1:
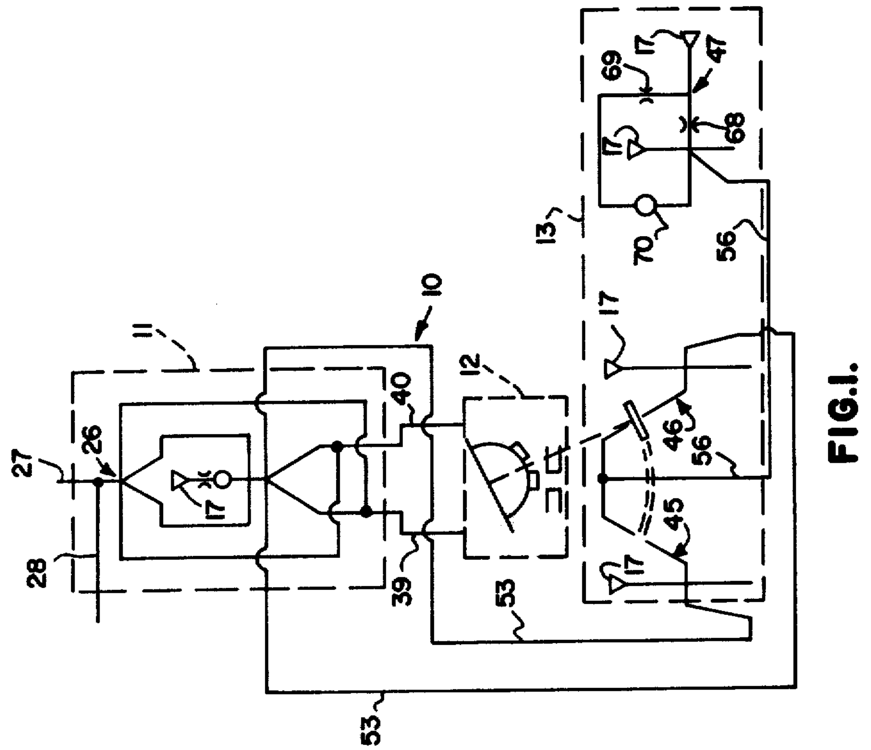
FIG. 1 is a general schematic view of a fluidic binary counter circuit with memory characteristics formed in accordance with the present invention.

Referring more particularly to FIG. 1 of the drawing, the numeral 10 designates the circuit in its entirety. As shown in FIG. 1, the circuit includes three main parts 11, 12 and 13, part 11 being a bistable fluidic amplifier, part 12 a latching indicator, and part 13 the memory circuit, these parts being enclosed by dotted rectangles to facilitate identification.

Figure 2:
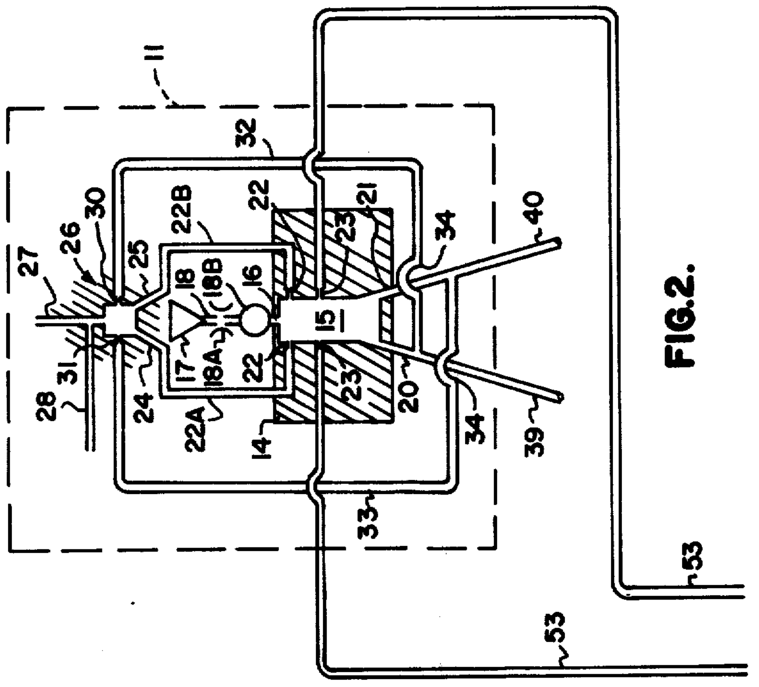
FIG. 2 is an enlarged schematic view of a fluidic bistable element employed in the counter circuit shown in FIG. 1.

The bistable fluidic amplifier 11, shown in greater detail in FIG. 2, is quite well known to those familiar with the fluidic art and, as usual, it includes a body 14 with a chamber 15 having an inlet 16 constituting a nozzle to direct a fluid beam into the chamber 15. The inlet is connected with a source of fluid pressure 17 by a passage 18. On the opposite side of the chamber 15 from the inlet the body is formed with diverging output ports 20 and 21 which alternately receive the fluid beam in the operation of the amplifier. The latter will preferably be of the type in which the beam attaches itself to one side wall of the chamber and flows out the adjacent output port until some force detaches it from such side wall and deflects it to the other output port, at which time it will attach itself to the adjacent chamber wall and remain until deflected therefrom by another force. Such deflecting forces may be introduced through control ports formed in the side walls of the body 14 at opposite sides of the chamber 15. In the amplifier shown, two sets 22 and 23 of control ports are provided. The ports of set 22 are connected by lines 22a and 22b with output ports 24 and 25 of a fluidic binary element 26 through which impulses from a generator (not shown), provided in connection with the item being monitored, are transmitted to the amplifier. These impulses constitute the signals to be counted. The element 26 has an inlet line 27 leading from the counting signal generator and also another line 28 by which signals may be selectively introduced to set the counter at a desired indication.

Output ports 24,25 receive the count signals from line 27, alternately depending upon which, of output ports 20 or 21 of the amplifier 14, is receiving the fluid beam from inlet 16. It will be noted that binary element 26 has opposed control ports 30 and 31 between the inlet and the output ports, and that lines 32 and 33, respectively, connect amplifier output ports 20 and 21 with control ports 30 and 31. These lines cross over, as at 34, so that when either output port 20 or 21 is receiving fluid pressure, such pressure will be fed back to the control port connected therewith and the next counting signal will be deflected into the opposite output port of the binary element to cause the amplifier beam to shift to the other output port of the latter. This action will transmit a counting impulse.

The counting impulses are employed to actuate the latching indicator which forms part 12. The latching indicator may be of any suitable design, the one shown in FIG. 3 being selected merely for illustrative purposes. Indicator 12 includes a member 35 mounted, as at 36, for pivotal movement in response to a fluid impulse issuing from one or the other of a pair of jets 37,38. These jets communicate via lines 39,40 with the output ports 20,21, respectively, of the amplifier 14. Member 35 is provided with indicia *35a*, such as figures "0" and "1" which are alternately visible through a viewing window 41 in the indicator casing when the member is in indicating positions. The indicator is of the latching type so that part of the indicia will remain exposed until the member is shifted to another indicating position exposing the other indicia. The newly exposed indicia will then remain in view until the next counting operation. As an example of the latching capability, the unit 12 has magnets 42, of suitable type, disposed to yieldably retain the member 35 in indicating positions. Member 35 has a finger 43 to engage and be held by the magnets. It will be obvious that the force of the magnets will be calculated to permit the member 35 to shift when a fluid impulse strikes either receiver 44. As the member shifts, in response to the impulse from one jet, the other receiver will be positioned in close proximity to the other jet. The next counting signal will cause an impulse to issue from the latter jet and the member will be shifted back to the previous position for the next succeeding operation.

As pointed out previously, an object of this invention is to provide the counter thus far described with a memory characteristic so that in the event the power source should be shut off, the indicator will remain in the indicating position occupied at the time of power interruption and until a counting signal is imparted after the power is restored. In other words, the restoration of power in itself will not cause an operation of the counting device.

To secure the above feature, the system part 13 called the "memory circuit" has been provided. This part includes a plurality of fluidic elements 45, 46 and 47. Elements 45 and 46 are known as "not" elements and one is provided for each indicating position of the member 35. As usual, each "not" has an inlet 48 communicating with the source 17 of fluid pressure. Inlet 48 forms a fluid beam which normally flows out through a vent port 50. The element has a control port 51 which when supplied with signal pressure will deflect the fluid beam away from the vent port and cause it to flow through the output port 52. Output ports 52 of the "not" elements are connected by lines 53 with the second set of control ports 23 of the amplifier 14. Signals transmitted to these ports will cause the beam in the amplifier to shift and send impulses to the indicator. In this system, the "not" elements are provided to insure that the indicator will remain in the position occupied until a counting impulse is applied to the amplifier. This action results from providing the member 35 with a lever 54 which swings with the member as it moves between indicating positions. The outer end of the lever carries a baffle 55 which interrupts fluid flow at predetermined times to the control ports 51 of the "not" elements 45 and 46.

Control ports 51 of elements 45 and 46 are supplied with fluid impulses through a line 56 which separates, as at 57, into two branches 58 and 59, the former leading to element 45 and the latter to element 46. Each branch includes sections which are spaced to permit baffle 55 to enter when the indicator is in a predetermined indicating position. It will be obvious that when baffle 55 is in the space between the sections of the inlet line of a particular "not" element, a fluid impulse supplied to line 56 will not reach the control port of such element and, therefore, fluid flowing from the pressure source to the "not" element will be vented. Since the fluid impulse is free, however, to flow to the control port of the other "not" element, fluid from the pressure source will be deflected to the output port of such element and a signal will flow to the amplifier control port served by this "not" element. This signal will impinge on the fluid beam of the amplifier to deflect it to the respective output port and apply a jet to the indicator. The "not" elements are so connected that irrespective of which indicating position the member 35 occupies, the signal transmitted will cause the amplifier to deliver an impulse which will tend to maintain the indicator in such position.

Figures 3, 4:
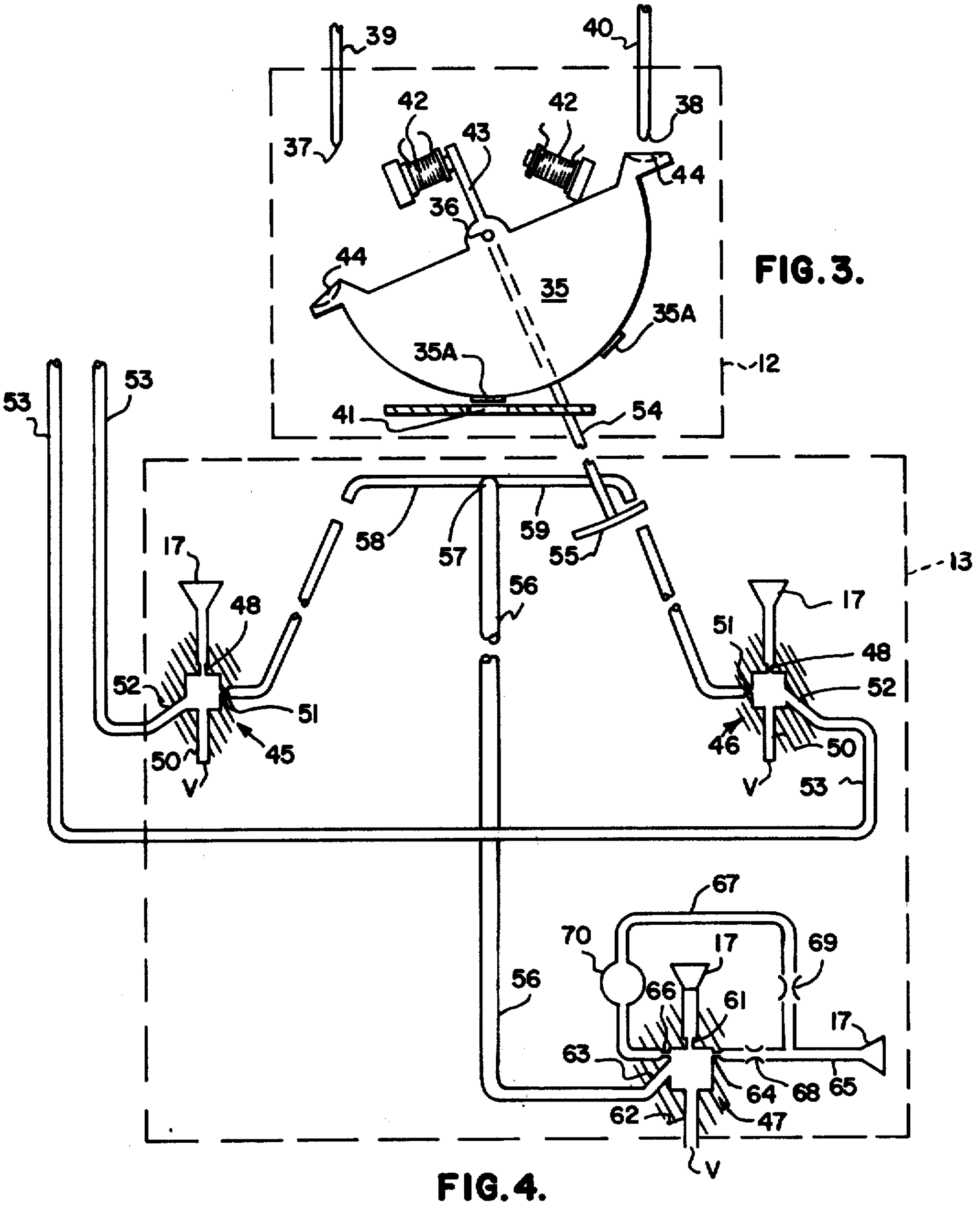
FIG. 3 is an enlarged view in greater detail of a latching indicator utilized in the counter shown in FIG. 1.
FIG. 4 is a similar view of an assembly of fluidic elements making up the part of the circuit in FIG. 1 which provides the memory characteristics.

The memory circuit 13 has means for supplying a single fluid impulse to line 56 which leads to the "not" elements, when fluid pressure is restored to the source 17. Such means includes the fluidic element 47 which is similar to a "not" element but modified to include a control port opposite the normal control port. As shown in FIG. 4, the device 47 has an inlet 61 communicating with the source 17, an outlet 62 leading to a vent, an output port 63 from which line 56 extends, and a control port 64 connected by a line 65 with the source 17. A second control port 66 is disposed opposite the port 64 and it is also connected by a line 67 with the source 17. Line 65 contains a restriction 68, while line 67 contains both a restriction 69 and a delay chamber 70. When fluid pressure is re-established in source 17 following an interruption, fluid will flow through inlet 61 and at first be exhausted through the outlet 62 to the vent. Fluid will also flow through line 65 and after a brief delay because of restriction 68, will impinge on the fluid entering the inlet, causing the fluid to be deflected to the output port 63 and flow through line 56 to the "not" elements. Fluid will also flow through line 67, but due to restriction 69 and delay chamber 70, a time interval of predetermined length will elapse, after which fluid pressure entering control port 66 will equalize forces on opposite sides of the fluid stream flowing in inlet 61 and the stream will be diverted from output port 63, back to outlet 62 which leads to the vent. It will be clear from the foregoing that device 47 provides a single fluid impulse of limited duration to the line 56 and consequently the "not" elements, or, at least, the one which is not blocked by the baffle 55. The device 47 is aptly termed a "one shot" element. As pointed out above, when the element 47 sends the fluid impulse to the "not" elements the one not blocked by baffle 55 will send a signal to the amplifier control port 23 connected therewith and the fluid beam will be caused to continue the flow of fluid pressure to the proper nozzle 37,38 to maintain the indicator position.

It is believed that the construction and operation of the fluidic binary counter stage with memory characteristics forming the invention should be clear from the foregoing description, but to insure a better understanding of the invention the operation may be summarized as follows:

Assume that the source 17 is energized, that a fluid beam has been formed in the chamber 15 of the amplifier, and that the output port 20 is receiving the fluid from the beam. Such fluid will flow through line 39 to nozzle 37 and the indicator member 35 will be in the position shown in FIG. 3. The engagement of arm 43 with the adjacent magnet will latch the indicator in such position. When a counting impulse is applied through line 27, it will be deflected by feedback pressure from amplifier output port 20 to control port 30, into output port 24, and through line 22a to control port 22 connected therewith. This impulse will impinge the amplifier beam and deflect it into output port 21. Flow from this port passes through line 40 to nozzle 38 and directs a fluid jet against the adjacent receiver 44. The force of the jet will disengage finger 43 from the magnet and rock member 35 to the other indicating position. Such counting operations will be repeated as long as the counting signals are transmitted through line 27.

In the event it is desired, or becomes necessary, to interrupt the supply of fluid pressure from source 17, the member 35 will remain in the indicating position occupied at the time of shutdown due to the latching effect of the magnet. For convenience, assume that the indicator is in the position shown in FIG. 3. When fluid pressure is restored at source 17, the element 47 will provide the single fluid impulse through line 56, as previously described. Since flow through line 59 to "not" element 46 is blocked, the fluid impulse will flow through line 58 to "not" element 45. As a result, a fluid impulse will be directed through line 53 to control port 23 at the right-hand side of amplifier 11, as viewed in FIG. 2, and a jet will be directed against the fluid beam to establish flow through output port 20, line 39 and nozzle 37. Since receiver 44, at this time, is spaced remotely from nozzle 37, the jet issuing from the latter will have no effect other than tending to maintain the position of the indicator. Such position will continue to be maintained until the next succeeding counting signal is supplied through line 27. To insure that the fluid impulse is applied to the control port 23 by the proper "not" element before the amplifier is supplied with fluid from the source 17, line 18 connecting the source 17 with inlet 16 is provided with both a restriction **18*a* and a delay chamber 18*b*. These elements will retard the introduction of fluid pressure for a short time period and permit the "one shot" element 47 to supply a fluid impulse to the "not" element which is not blocked by baffle 55**. Such "not" element will send a signal to the control port connected therewith, as previously described, insuring the flow of pressure to the indicator to maintain the previous indicating position.

For purposes of clarification it may be pointed out that when fluid pressure is reestablished in source 17, following an interruption, the delay caused by restriction 68 of element 47 will be infinitesimal while the delay caused by restriction 69 and chamber 70 will be for a time period long enough to permit the establishment of a fluid signal from the active "not" element to the amplifier control port connected therewith. The delay caused by restriction **18*a* and chamber 18*b* in amplifier inlet line 18 will only be long enough for the establishment of the fluid signal flow in the respective fluid line 53. After the delay period caused by restriction 18*a* and chamber 18*b* terminates and a signal is transmitted to the indicator to maintain its previous position the delay period caused by restriction 69 and chamber 70 will terminate and the signal flow from the "one shot" element 47** to the "not" elements will end. At this time the memory circuit will have served its purpose.

I claim:

1. A fluidic binary counter with a memory characteristic, comprising:

a. a fluidic circuit having a bistable fluidic amplifier with an inlet connected with a source of fluid pressure, a pair of control ports, spaced output ports and means for applying a counting signal;
b. indicator means responsive to fluid flow from said output ports to move between indicating positions;
c. a branch circuit with a plurality of "not" elements, each "not" element having an inlet connected with the source of fluid pressure, a vent port normally receiving and venting fluid supplied to said inlet, an output port connected with a control port of said bistable amplifier, and a control port for diverting fluid from the "not" element inlet to said output port;
d. means for directing a single fluid impulse to the control ports of said "not" elements when the source of fluid pressure is initially energized; and
e. means dependent upon the position of said indicator means for blocking the application of the fluid impulse to the control port of a predetermined "not" element to prevent the direction of fluid from the output port of such "not" element to the respective control port of said bistable amplifier.

2. The fluidic binary counter of claim 1 in which the indicator means has latching means for temporarily retaining it in indicating positions.

3. The fluidic binary counter of claim 1 in which the indicator means has a member mounted for rocking movement between indicating positions.

4. The fluidic binary counter of claim 3 in which the means for blocking the application of the fluid impulse to the control port of a predetermined "not" element has a baffle secured for movement with the rocking member into the flow path of the fluid impulse.

5. The fluidic binary counter of claim 3 in which the rocking member has indicia thereon and a viewing window is located adjacent said member at the indicating position to display said indicia.

6. The fluidic binary counter of claim 1 in which said bistable fluidic amplifier has means adjacent said inlet to momentarily delay the flow of fluid pressure thereto when source pressure is restored following an interruption thereof.

7. The fluidic binary counter of claim 1 in which the means for directing a single fluid impulse to the control ports of the "not" elements has a fluidic member with an inlet connected with the source of fluid pressure, a vent port normally receiving and venting fluid supplied to said inlet, an output port connected by conductor means with the control ports of said "not" elements, and means for momentarily deflecting fluid from the inlet of said fluidic member to the output port thereof.

8. The fluidic binary counter of claim 7 in which the conductor means connecting the output port of the fluidic member with the control ports of the "not" elements has spaced sections upstream of the control ports and the means for blocking the application of the fluid impulse to the control port of the "not" element has a baffle secured for movement by the indicator means into the space between the sections of the conductor means of a predetermined "not" element.

* * * * *